United States Patent [19]

Curry

[11] Patent Number: 4,666,779

[45] Date of Patent: May 19, 1987

[54] METHYL METHACRYLIC COATINGS ON THERMOPLASTIC SUBSTRATES

[75] Inventor: Herbert L. Curry, Mt. Vernon, Ind.

[73] Assignee: General Electric Company, Pittsfield, Mass.

[21] Appl. No.: 696,671

[22] Filed: Jan. 30, 1985

[51] Int. Cl.[4] .......................... B32B 27/36; B32B 27/08
[52] U.S. Cl. ...................................... 428/412; 428/522
[58] Field of Search ................. 427/160; 428/412, 522

[56] References Cited

U.S. PATENT DOCUMENTS

| 3,582,398 | 6/1971 | Ringler | 427/160 |
|---|---|---|---|
| 4,396,678 | 8/1983 | Olson | 428/412 |
| 4,410,595 | 10/1983 | Matsumoto et al. | 428/412 |

*Primary Examiner*—Thomas J. Herbert
*Attorney, Agent, or Firm*—William F. Mufatti; Michael J. Doyle; Martin Barancik

[57] ABSTRACT

Methyl methacrylic UV protective coatings for thermoplastic substrates are disclosed with improved resistance to microcracking.

5 Claims, No Drawings

METHYL METHACRYLIC COATINGS ON THERMOPLASTIC SUBSTRATES

This invention relates to UV light stable thermoplastic articles and to a method for making the same. More particularly, this invention relates to UV light stable thermoplastic articles having a methyl methacrylic coating on a thermoplastic substrate, particularly, a polycarbonate substrate.

BACKGROUND OF THE INVENTION

Transparent coatings of poly(methyl methacrylate) homopolymers and copolymers are known and applied to thermoplastic substrates, particularly, polycarbonate substrates, to impart UV light stablility to the finished article. However, it has long been a problem with such coatings, that a single formulation could not be discovered to provide desirable properties in all areas, i.e., including high gloss, retention of gloss after weathering, heat distortion temperature, elongation at break, UV stability, and resistance to microcracking. Particularly, microcracking with aging and exposure to weather has been a serious problem in such coatings.

U.S. Pat. No. 3,582,398 assigned to the same assignee as the present invention discloses the use of the polyacrylates in general and specifically the polymethacrylates as coatings on polycarbonate substrates to enhance optical properties. These coatings are known on occasion to microcrack and degrade with age and weathering.

Therefore, it is an object of the present invention to provide thermoplastic articles with a solvent and abrasion resistant methyl methacrylic coating, which coating has improved resistance to microcracking yet maintains desirable heat distortion properties, transparency, high gloss, good retention of gloss after weathering, desirable elongation at break, and excellent UV stability.

It is yet another object of the invention to provide polycarbonate articles with the same polymethylmethacrylic coatings and properties.

It is still another object of the present invention to provide a method for protecting thermoplastic substrates from UV degradation with improved weathering properties in the protective coating used to accomplish the same.

DETAILED DESCRIPTION OF THE INVENTION

Briefly, according to the present invention, certain copolymers of methyl methacrylate and ethyl methacrylate, n-butyl methacrylate, or i-butyl methacrylate are found to have surprising resistance to microcracking upon aging and weathering as well as other desirable properties when applied as a protective coating composition to thermoplastic substrates, particularly, polycarbonate substrates. These coatings are characterized by high ratios of methyl ester to ethyl, n-butyl, or i-butyl esters, moderate values of elongation at break and glass transition temperatures of 87° C. and above.

The protective coating of the present invention may be applied to any thermoplastic article or sheet. Suitable thermoplastics include: acrylic and methacrylic polymers or copolymers; acetal homopolymers; acetal copolymers produced by polymerization of trioxane and ethylene oxide; epoxy resins; phenylene oxide based resins such as polyphenylene oxide and blends of polyphenylene oxide and styrene resins; polyaryl ethers; polyesters; polyethylene; polyphenylene sulfides; polypropylene; polysulfones; ethylene polymers such as ethyl vinyl acetates; and necessary compatabilizers.

The preferred thermoplastic substrate for use with the protective coating described herein is a polycarbonate article or sheet. Suitable polycarbonates may be prepared by reacting a dihydric phenol with a carbonate precursor, such as phosgene, haloformate or a carbonate ester. Typically, they will have recurring structural units of the formula:

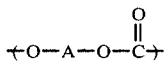

wherein A is a divalent aromatic radical of the dihydric phenol employed in the polymer producing reaction. Preferably, the aromatic carbonate polymers have an intrinsic viscosity ranging from 0.30 to 1.0 dl./g. (measured in methylene chloride at 25° C.) By dihydric phenols is meant mononuclear or polynuclear aromatic compounds containing two hydroxy radicals, each of which is attached to a carbon atom of an aromatic nucleus. Typical dihydric phenols include 2,2-bis-(4-hydroxyphenyl)propane; 2,2-bis-(3,5-dimethyl-4-hydroxyphenyl)propane, 4,4'-dihydroxy-diphenyl ether, bis(2-hydroxyphenyl)methane, mixtures thereof and the like. The preferred aromatic carbonate polymer for use herein is a homopolymer derived from 2,2-bis(4-hydroxyphenyl)propane, i.e., bisphenol-A.

The protective coating of the present invention is a methyl methacrylic thermoplastic random copolymer with methacrylic modifying units of ethyl methacrylate, n-butyl methacrylate, i-butyl methacrylate, or mixtures thereof and optionally, modifying units of other alpha-beta ethylenically unsaturated compounds. The modifying units must be combined with the methyl methacrylic units in the random copolymer in such ratio as to result in a thermoplastic material having a tensile elongation at break (23° C., 50 percent RH) of greater than about 3.5 percent and a glass transition temperature of greater than about 87° C.

Persons skilled in the art of methacrylic polymer chemistry may determine the proper makeup and molecular weight of the random methyl methacrylic copolymer to achieve the required physical properties. However, to retain the methyl methacrylic character of the finished protective coat, no more than about ½ percent to about 10 percent by number of the mers of the copolymer chain may be derived from methacrylic modifying units of ethyl methacrylate, n-butyl methacrylate, i-butyl methacrylate, or mixtures thereof and optionally, no more than 5 percent by number of the mers of the copolymer chain may be from modifying units of other alpha-beta ethylenically unsaturated modifying units so long as they do not radically alter the properties of the copolymer. Suitable alpha-beta ethylenically unsaturated modifying units may be derived from, for example, acrylic acid, methacrylic acid, alkyl esters of acrylic and methacrylic acids (the alkyl group having 1 to 4 carbon atoms), acrylonitrile, methacrylonitrile, styrene and its derivatives, ethene, propene, etc. Preferably, the methacrylic modifying unit is derived from ethyl methacrylate and the other ethylenically unsaturated modifying unit is derived from ethylene.

Suitable protective coatings of the present invention may be derived from commercial methyl methacrvlic materials or blends of commercial methyl methacrylic materials presently on the market. Such commercial methyl methacrylic materials usually require the addition of suitable solvents according to the method chosen for application to the substrate and drying. A particular commercial methyl methacrylic material suitable for use herein is sold as ELVACITE TM bead polymer Grade 2021 by DuPont E. I. de Nemours and Company. This "ELVACITE 2021" has a specific gravity 25°/25° C., of 1.2, a glass transition temperature of 100° C., tensile strength (23° C., 50 percent RH) of 15,000 psi (106 MPa), and elongation at break (23° C., 50 percent RH) of 4%.

The protective coating of the present invention should be applied to the thermoplastic substrate by use of a suitable organic solvent system. Generally, it is best to adapt the solvent system according to the method of application to optimally balance the evaporation rate of the solvent in a drying step against the aggressiveness of the solvent on the substrate. Although persons skilled in the art can readily imagine organic solvents suitable for use herein, suggested solvents are hydroxy ethers, aliphatic alcohols, and ketones.

Suitable hydroxy ethers may be represented by the general formula:

$$R^1-O-R^2-OH$$

wherein $R^1$ is an alkyl radical or hydroxy substituted alkyl radical and $R^2$ is an alkylidene radical and preferably, the sum of the carbon atoms present in $R^1$ and $R^2$ is from 3 to about 10. Specifically, suitable hydroxy ethers are ethylene glycol monoethyl ether, propylene glycol monoethyl ether, ethylene glycol monobutyl ether, etc. Suitable aliphatic alcohols contain from 1 to 4 carbon atoms and include methanol, ethanol, isopropanol, t-butanol, isobutyl alcohol and the like. Suitable ketones may be represented by the general formula:

$$R^3-\overset{O}{\underset{\|}{C}}-R^4$$

wherein $R^3$ and $R^4$ are alkyl radicals or hydroxy substituted alkyl radicals the preferred sum of the carbon atoms of which varies from about 2 to about 10. Specifically, suitable ketones are, for example, methyl ethyl ketone, acetone, 4-hydroxy-2-keto-4-methylpentane (diacetone alcohol), etc. Of course, these organic solvents may be blended with each other or with other organic solvents to arrive at a proper solvent system.

Solvent system is added to the methyl methacrylic polymer for the purpose of applying the protective coat to the substrate in an amount sufficient to dissolve the polymer but not in such an amount that an undue burden is placed on the drying equipment to dry and produce the protective coat. The optimum ratio of solvent to methacrylic polymer changes according to the method of application used, the constituents of the solvent system, and the desired viscosity. Generally, the weight ratio of solvent system to methacrylic polymer will vary from about 99/1 to about ½.

Ultraviolet light absorbing compounds must be present in an amount effective to protect the thermoplastic substrate particularly polycarbonate substrate from the degradative effects of ultraviolet light. Ultraviolet light absorbing compounds preferred for use in the present invention, are those with a high affinity for the substrate as opposed to the methyl methacrylic protective coating. Thus, UV light absorbing compounds impregnated into the substrate before the protective coating step should have a low tendency to migrate into adjoining layers or bloom, and UV light absorbing agents applied through surface impregnation simultaneous to the application of the protective coating should have a high tendency to migrate into the substrate and out of the protective coating layer. Some non-limiting examples of UV light absorbing compounds suitable for use herein, especially for surface impregnation of polycarbonate substrates, are benzephenone derivatives such as 2,2'-dihydroxybenzophenone, 2,2'-dihydroxy-4,4'-dimethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone; and the like; and diphenylcyanoacrylates such as ethyl-2-cyano-3,3-diphenylacrylate, 2-ethylhexyl-2-cyano-3,3-diphenylacrylate, lower aliphatic substituted diphenyls thereof, lower aliphatic substituted esters thereof, and the like.

The UV light absorber, for application by surface impregnation, is added to the methyl methacrylic polymer/solvent system composition in amounts effective to protect the substrate. However, the amount of UV light absorbing compound added becomes excessive when the drying conditions of the protective coating are not effective to complete migration of the UV light absorbing compound out of the protective coating or the substrate is unable to absorb the entire amount of UV light absorbing compound.

The methyl methacrylic polymer/solvent system compositions of the instant invention may also optionally contain various flatting agents, surface-active agents, stabilizers such as antioxidants, and thixotropic agents. All of these additives and the use thereof are well known in the art and do not require extensive discussion. Any compound possessing the ability to function in such a manner, i.e., as a flatting agent, surface-active agent, and stabilizer, can be used provided they do not adversely effect the required physical properties of the protective coating or adhesion.

The methyl methacrylic polymer/solvent system composition may be applied to the thermoplastic substrate by any of the well known methods such as spraying, dipping, roll-coating, flow coating, and the like. Usually, the composition is applied in an amount sufficient to provide a dried protective coating having a thickness of from about 0.01 to about 1.0 mil. As stated above, the optimum solvent system may change according to the method of application chosen with, for example, less viscous solvent systems being used for spray coating and solvent systems of higher viscosity being used for dip coating.

The solvent system is evaporated with air drying and heating to leave an even and uniform protective layer of methyl methacrylic polymer. Generally, it is desirable that the drying time of the protective coating be as short as possible and thus the temperature of the drying step should be as great as practical. However, the temperature should not approach the heat distortion temperature of the substrate, the flash temperature of the organic solvent, or the boiling point of the organic solvent. In the case where a UV light absorber is to be applied to the substrate by surface impregnation, the drying temperature and time must be sufficient to induce and complete migration of the UV light absorbing compound from the protective methacrylic coating into the substrate. Commonly, drying times vary from about 10 minutes to 30 minutes and drying temperatures range from about 120° C. to about 130° C.

Thus has been described a protective coating for thermoplastic substrates, especially polycarbonate substrates, having resistance to microcracking upon aging, weatherability, high gloss, good hardness, and improved cold bending. These protective coatings are copolymers of methyl methacrylate with ethyl methacrylate, n-butyl methacrylate, and/or i-butyl methacrylate and optionally, small amounts of other alpha-beta ethylenically unsaturated compounds which have been formulated and copolymerized to produce a protective methyl methacrylic coating having a glass transition temperature of greater than about 87° C. and an elongation at break (23° C., 50 percent RH) of greater than about 3.5%.

DESCRIPTION OF THE PREFERRED EMBODIMENTS

In order that those skilled in the art will be better able to practice the invention, the following examples are given by way of illustration and not be way of limitation. All parts, except as otherwise indicated, are by weight.

EXAMPLE 1

Coating compositions having the following formulations were prepared by mixing the ingredients thoroughly.

|  | A | B* | C* |
|---|---|---|---|
| PMMA | 6.5[1] | 6.5[2] | 10[2] |
| Solvent | 90 | 90 | 70 |
| UV Absorber | 3.5 | 3.5 | 20 |

[1] ELVACITE 2021 resin, methyl methacrylate copolymer, DuPont Company: Elongation at Break (23° C., 50% RH) 4% and Glass Transition Temperature 100° C.
[2] ELVACITE 2008 resin, methyl methacrylate copolymer, DuPont Company: Elongation at Break (23° C., 50% RH), 0.5% and Glass Transition Temperature 105° C.
*Control

EXAMPLE 2

A 125 mil polycarbonate sheet of LEXAN 103 resin manufactured by General Electric Company was dip coated with composition A of Example 1 and dried to a coating thickness of 0.3 mil in an oven at 127° C. for 10 minutes. The resulting composite was clear and tack free with no substantial amounts of UV absorber in the methyl methacrylic protective coat.

Example 3

A 125 mil polycarbonate sheet of LEXAN 103 resin was dip coated with composition B of Example 1 and dried to a coating thickness of 0.3 mil in our oven at 127° C. for 10 minutes. The resulting composite was as described in Example 2.

EXAMPLE 4

A 125 mil polycarbonate sheet of LEXAN 103 resin was curtain coated with composition C of Example 1 and dried to a coating thickness of 0.6 mil in an oven at 127° C. for 10 minutes. The resulting composite was as described in Example 2.

EXAMPLE 5

The composites of Example 2-4 were exposed in an accelerated UV exposure chamber manufactured by Atlas Electric Devices, Chicago, Ill., using 40 watt florescent UV lamps at an operating cycle of 8 Hours ON/60° C./75% RH and 4 Hours OFF/50° C./100% RH. The time to microcracking for each sample is shown below:

|  | MICROCRACK | | |
|---|---|---|---|
| HOURS | Example 2 | Example 3 | Example 4 |
| 0 | No | No | No |
| 300 | No | No | No |
| 600 | No | No | No |
| 900 | No | No | No |
| 1200 | No | No | Yes |
| 1500 | No | No | Yes |
| 1800 | No | Yes | Yes |
| 2100 | No | Yes | Yes |

EXAMPLE 6

Coating compositions having the following formulations were prepared by mixing the ingredients thoroughly.

|  | D | E* |
|---|---|---|
| PMMA[1] | 20 | — |
| PA[3] | — | ~20 |
| Solvent | 70 | ~75 |
| UV Absorber | 10 | ~5 |

[1] ELVACITE 2021 resin, methyl methacrylate copolymer, DuPont Company: Elongation at break (23° C., 50% RH), 4% and Glass Transition Temperature 100° C.
[3] ethyl acrylate/butyl acrylate copolymer.
*control

EXAMPLE 7

A profiled polycarbonate sheet sold as THERMO-CLEAR profiled sheet by General Electric Company was dip coated with composition D of Example 6 and dried to a coating thickness of 0.3 mil in an oven at 127° C. for 5-10 minutes. The resulting composite was tack free with no substantial amounts of UV absorber in the methyl methacrylic protective coat.

EXAMPLE 8

A profiled polycarbonate sheet sold as THERMO-CLEAR profiled sheet was coated with composition E of Example 6 and dried to a coating thickness of 0.6 mil in an oven at 127° C. for 5-10 minutes. The resulting composite was clear and tack free with small amounts of UV absorber in the acrylate copolymer protective coat.

EXAMPLE 9

The composites of Examples 7 and 8 were placed under a 0.3% stress and exposed in an accelerated UV exposure chamber manufactured by Atlas Electric Devices, Chicago, Ill. using 40 watt florescent lamps at an operating cycle of 8 Hours ON/60° C./75% RH and 4 Hours OFF/50° C./100% RH. The time to microcrack for each sample is shown below:

| HOURS | MIRCOCRACK | |
| --- | --- | --- |
| | Example 7 | Example 8 |
| 0 | No | No |
| 46 | No | No |
| 200 | No | No |
| 425 | No | No |
| 725 | No | No |
| 900 | No | No |
| 1175 | No | Yes |
| 1660 | No | Yes |
| 1900 | No | Yes |

What is claimed is:

1. A UV stable article comprising a thermoplastic substrate and a microcrack resistant protective external coat comprising a copolymer consisting essentially of:
 (a) methyl methacrylate units,
 (b) from about ½ percent up to about 10 percent by number of other methacrylate units selected from the group consisting of ethyl methacrylate, n-butyl methacrylate, i-butyl methacrylate, or mixtures thereof, and
 (c) from 0 percent up to 5 percent by number of other alpha-beta ethylenically unsaturated units; wherein said units are combined in such ratio to result in a copolymer material having a tensile elongation at break of greater than about 3.5 percent and a glass transition temperature greater than about 87° C.

2. The articles of claim 1 wherein said thermoplastic substrate is polycarbonate.

3. The article of claim 1 wherein said other methacrylate units are ethyl methacrylate units.

4. The article of claim 1 wherein said other unsaturated units are polyethylene units.

5. A UV stable article comprising a polycarbonate substrate and a microcrack resistant protective external coat comprising a copolymer consisting essentially of:
 (a) methyl methacrylate units,
 (b) from about ½ percent up to about 10 percent by number ethyl methacrylate units, and
 (c) from 0 percent up to 5 percent by number of other alpha-beta ethylenically unsaturated units;
wherein said units are combined in such ratio to result in a copolymer material having a tensile elongation at break (23° C., 50 percent RH) of greater than 3.5 percent and a glass transition temperature greater than about 87° C.

* * * * *